United States Patent [19]
Thomas et al.

[11] Patent Number: 5,393,963
[45] Date of Patent: Feb. 28, 1995

[54] CHECK AUTHORIZATION SYSTEM AND PROCESS

[75] Inventors: Harvey P. Thomas; Audrey C. Thomas, both of Knapp; Daniel A. Carr, Menomonie, all of Wis.

[73] Assignee: Company Chex, Inc., Knapp, Wis.

[21] Appl. No.: 852,656

[22] Filed: Mar. 17, 1992

[51] Int. Cl.⁶ ............................................. G06F 15/30
[52] U.S. Cl. ..................................... 235/379; 364/405
[58] Field of Search ................. 235/379; 364/408, 405, 364/401

[56] References Cited

U.S. PATENT DOCUMENTS

| | | | |
|---|---|---|---|
| 3,852,571 | 12/1974 | Hall et al. | 235/61.7 |
| 4,109,238 | 8/1978 | Creekmore | 340/149 |
| 4,187,498 | 2/1980 | Creekmore | 340/149 |
| 4,404,649 | 9/1983 | Nunley et al. | 364/900 |
| 4,417,136 | 11/1983 | Rushby et al. | 235/379 |
| 4,598,367 | 7/1986 | DeFrancesco et al. | 364/408 |
| 4,672,377 | 6/1987 | Murphy et al. | 340/825 |
| 4,686,357 | 8/1987 | Douno et al. | 235/379 |
| 4,905,281 | 2/1990 | Surjaatmadja et al. | 380/25 |
| 5,007,084 | 4/1991 | Materna et al. | 380/24 |

*Primary Examiner*—Andrew M. Dolinar
*Attorney, Agent, or Firm*—Hugh D. Jaeger

[57] ABSTRACT

A check authorization system and process that provides an issuing company to control all aspects of the check authorization, including the issuing of transaction authorization, the transaction approval, and the bank reconciliation. Presigned drafts are carried by authorized personnel for use when away from one's domicile. When funds are required, an authorized person obtains a transaction authorization number form the issuing company via telephone for recordation upon the presigned draft. The location cashing the draft contacts the issuing company for a transaction approval code, which is recorded on the draft, before accepting and cashing the draft. Subsequently, the draft is presented to a bank for payment. The securing of or transaction authorization number requires the recordation of the area code and telephone number for tracking of the authorized person's location.

19 Claims, 11 Drawing Sheets

Company Chex
Confidential Draft Authorization Record

DATE ______

9 +      001      391553              ONE SET OF 3 NUMBERS BELOW
       DRIVER    SERIES NUMBER 337   727   155   750   714   229   (499)   468   678
 25    50    75   100   125   150    175    200   OTHER

PAYEE ______                              AMOUNT ______

CONTROL ______ AUTHORIZED BY ______

** ALWAYS CIRCLE THE 'AMOUNT CODE' EQUAL TO THE TRANSACTION AMOUNT. YOU SHOULD ALWAYS ASK FOR THE DRIVER TO 'READ BACK' THEIR TRANSACTION NUMBER TO INSURE CORRECTNESS. NEVER GIVE THIS CODE TO ANYONE BUT THE INTENDED RECEIVER.

FIG. 3

COMPANY CHEX
SUMMARY OF TRANSACTION RECORDS

PRINT DATE: 03/12/92
PAGE: 1

*CONFIDENTIAL* - DO NOT DUPLICATE

| 9 | NUMBER SERIES | 25 | 50 | 75 | 100 | 125 | 150 | 175 | 200 | DTR | APP | DRAFT | DRIVERS NAME | DATE |
|---|---|---|---|---|---|---|---|---|---|---|---|---|---|---|
| 9 +____+ | 391778 | 315 | 421 | 499 | 385 | 946 | 963 | 743 | 100 | 385 | 14963 | | | |
| 9 +____+ | 391779 | 583 | 429 | 786 | 966 | 858 | 317 | 223 | 599 | 377 | 76507 | | | |
| 9 +____+ | 391780 | 868 | 224 | 509 | 286 | 907 | 467 | 633 | 539 | 798 | 52705 | | | |
| 9 +____+ | 391781 | 259 | 679 | 929 | 372 | 637 | 500 | 618 | 399 | 742 | 56920 | | | |
| 9 +____+ | 391782 | 292 | 402 | 815 | 285 | 931 | 266 | 127 | 895 | 724 | 27042 | | | |
| 9 +____+ | 391783 | 346 | 718 | 499 | 148 | 161 | 436 | 110 | 280 | 134 | 66960 | | | |
| 9 +____+ | 391784 | 831 | 987 | 823 | 843 | 886 | 385 | 195 | 284 | 148 | 10642 | | | |
| 9 +____+ | 391785 | 697 | 399 | 125 | 650 | 403 | 842 | 366 | 454 | 650 | 36655 | | | |
| 9 +____+ | 391786 | 600 | 705 | 970 | 374 | 749 | 302 | 297 | 292 | 553 | 47152 | | | |
| 9 +____+ | 391787 | 928 | 315 | 424 | 974 | 631 | 921 | 675 | 210 | 208 | 59374 | | | |
| 9 +____+ | 391788 | 989 | 969 | 256 | 159 | 858 | 468 | 696 | 279 | 418 | 27356 | | | |
| 9 +____+ | 391789 | 442 | 315 | 867 | 130 | 270 | 499 | 345 | 542 | 687 | 22846 | | | |
| 9 +____+ | 391790 | 479 | 220 | 850 | 836 | 931 | 428 | 778 | 646 | 979 | 10342 | | | |
| 9 +____+ | 391791 | 385 | 134 | 968 | 660 | 684 | 251 | 820 | 737 | 798 | 11384 | | | |
| 9 +____+ | 391792 | 896 | 860 | 559 | 881 | 100 | 577 | 685 | 923 | 962 | 26929 | | | |
| 9 +____+ | 391793 | 808 | 442 | 677 | 497 | 653 | 780 | 299 | 985 | 385 | 24185 | | | |
| 9 +____+ | 391794 | 300 | 128 | 207 | 966 | 632 | 990 | 282 | 994 | 574 | 42213 | | | |
| 9 +____+ | 391795 | 690 | 582 | 709 | 610 | 721 | 315 | 979 | 582 | 174 | 63794 | | | |
| 9 +____+ | 391796 | 243 | 308 | 137 | 261 | 641 | 577 | 875 | 604 | 733 | 83919 | | | |
| 9 +____+ | 391797 | 448 | 625 | 140 | 143 | 429 | 874 | 621 | 516 | 296 | 43859 | | | |
| 9 +____+ | 391798 | 235 | 455 | 516 | 107 | 196 | 784 | 141 | 642 | 610 | 72611 | | | |
| 9 +____+ | 391799 | 940 | 835 | 942 | 935 | 948 | 124 | 396 | 873 | 494 | 66048 | | | |

FIG. 4

00300-170001      REPORT 371                                PAYABLE THROUGH                                                02-03-92
NORWEST BANK MINNESOTA, N.A.                              RECONCILIATION REPORTS                                    PAGE       1

ACCT NO. 00300        000000000783463         MOBILE TRANSPORT SERVICES, INC         REPORT      PAID ONLY         AS OF DATE 02-03-92

| C SERIAL<br>D NUMBER | CHECK AMOUNT<br>PAID    O/S | DATE<br>PAID | DATE<br>ISSUED | SEQ.<br>NO. | PAYEE<br>IDENTIFICATION | C SERIAL<br>D NUMBER | CHECK AMOUNT<br>PAID    O/S | DATE<br>PAID | DATE<br>ISSUED | SEQ.<br>NO. | PAYEE<br>IDENTIFICATION |
|---|---|---|---|---|---|---|---|---|---|---|---|
| 10037 | 50.00 | 020392 | | 38317354 | | | | | | | |
| 10214 | 200.00 | 020392 | | 44851995 | | | | | | | |
| 10215 | 150.00 | 020392 | | 44847685 | | | | | | | |
| 10216 | 75.00 | 020392 | | 38279742 | | | | | | | |
| 10235 | 200.00 | 020392 | | 44894275 | | | | | | | |
| 10236 | 100.00 | 020392 | | 61935794 | | | | | | | |
| 10309 | 100.00 | 020392 | | 44842831 | | | | | | | |
| 10421 | 100.00 | 020392 | | 38115357 | | | | | | | |
| 10464 | 100.00 | 020392 | | 38319237 | | | | | | | |
| 12079 | 200.00 | 020392 | | 44892331 | | | | | | | |
| 12272 | 200.00 | 020392 | | 38342319 | | | | | | | |
| 19527 | 200.00 | 020392 | | 44875379 | | | | | | | |
| 19529 | 150.00 | 020392 | | 11359730 | | | | | | | |
| 19707 | 100.00 | 020392 | | 61930955 | | | | | | | |
| 19708 | 100.00 | 020392 | | 44883322 | | | | | | | |

CHECK AUTHORIZATION SYSTEM AND PROCESS

BACKGROUND OF THE INVENTION

1. Field of the Invention

The present invention pertains to a check authorization/money transfer, and more particularly, pertains to a check authorization system and process to dispense and account for funds regarding payments of business expenses for persons incurring expenses away from their domicile, such as truck drivers.

2. Description of the Prior Art

In all of the previous prior art check authorization systems, the only control the issuing company has is the issuance of the transaction number. All other aspects of the check authorization are handled by the second party that handled the approval of the check. The issuing company must have guaranteed the funds with the second party. This may be in the form of a surety bond or a cash deposit, which must be resupplied daily by the issuing company. The issuing company has no way of bank reconciliation with the previous systems on that day.

The present invention overcomes the shortcomings of the prior art systems by maintaining direct control concerning check authorization, including real authorization and approval of each transaction and the bank reconciliation on a real time basis.

SUMMARY OF THE INVENTION

The general purpose of the present invention is a process that the recipient or authorized personnel has a book of presigned drafts in their possession which are presented to another party for payment of an expense. The company issues a transaction number to the recipient who presents the draft to be cashed. The location cashing the draft for the recipient must telephone the issuing company to obtain an approval code before accepting the draft. Once the company has verified the transaction number, an approval code is issued and the draft is presented to a bank for payment through a payable through account. This system offers the company the advantages of complete control of their money on a daily basis, and their employees' financial transactions. One feature of the present invention also records the area code and telephone number where the transaction is made so that the whereabouts of the recipient can be verified or tracked by telephone.

According to one embodiment of the present invention, there is provided a check authorization system and process for issuing of a transaction authorization, a transaction approval, and a bank reconciliation. Interaction between a company, an employee in transit and a merchant are now described and illustrated.

Other embodiments of the present invention include those of a draft, an authorization record, a bank reconciliation form, computer hardware and software, and a manual approval form.

One significant aspect and feature of the present invention is a check authorization system and process where a company has complete control of their on-the-road disbursements for an employee.

Another significant aspect and feature of the present invention is a check authorization system and process which identifies the location of an employee where transactions occur.

A further significant aspect and feature of the present invention is a check authorization system and process where a cost savings for transaction charges is realized on a real time basis.

Yet another significant aspect and feature of the present invention is a check authorization system and process where a company issuing a draft is not required to purchase a bond or deposit crash with a second party which saves considerable money.

Still another significant aspect and feature of the present invention is a check authorization system and process where a company can reconcile its own bank account on a daily basis.

Yet a further significant aspect and feature of the present invention is a check authorization system and process which can be customized to reflect the needs of a company issuing a draft for an employee for any type of business.

Having thus described the embodiments of the present invention, it is a principal object hereof to provide a check authorization system and process.

One object of the present invention is a check authorization system and process for use by an employee when away from the company, such as being on the road.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
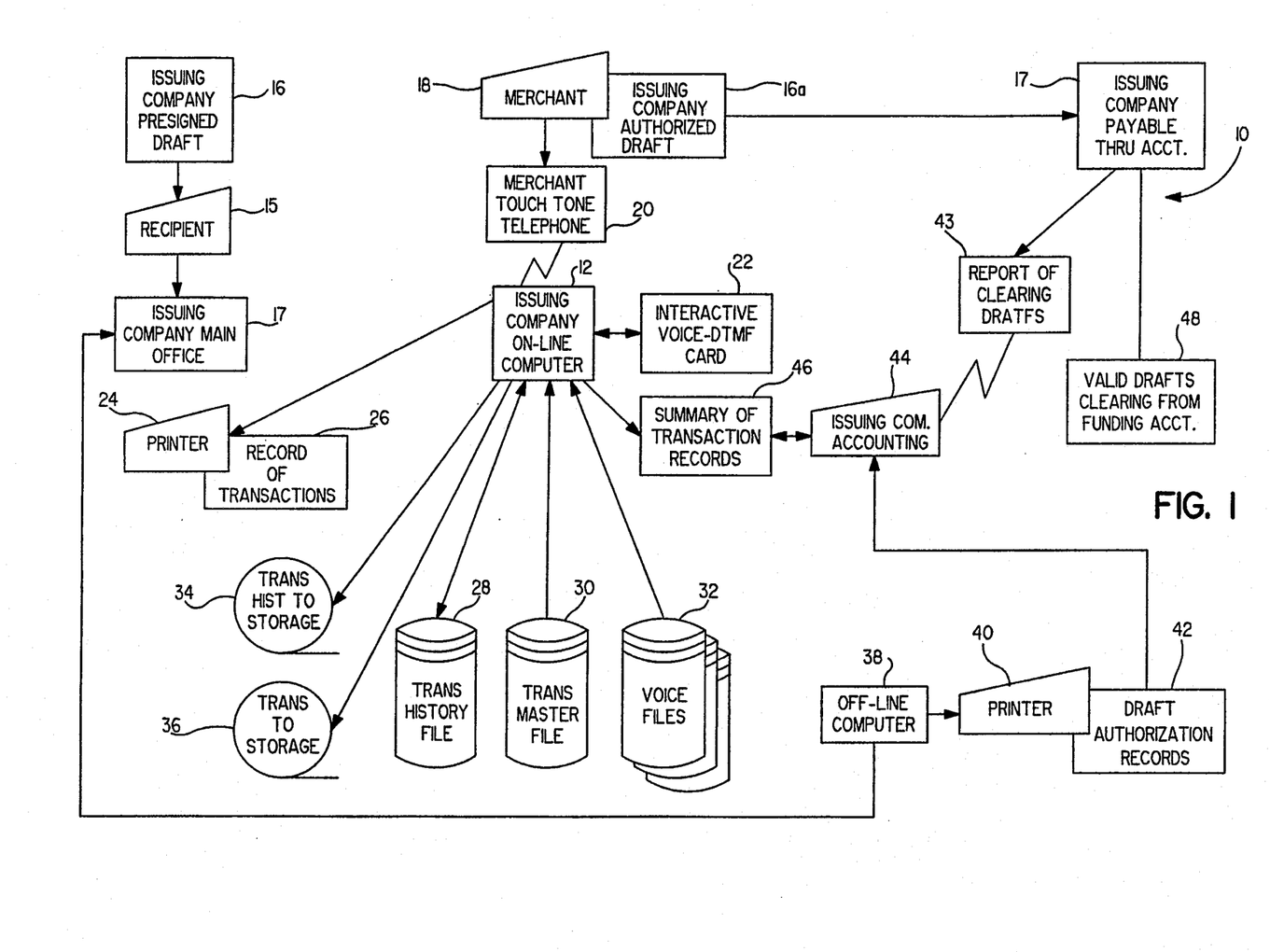
FIG. 1 illustrates a block diagram of a check authorization system, the present invention.

FIG. 1 illustrates a block diagram of a check authorization system and process 10 including a number of forms, including, but not limited to, a presigned bank draft, an authorization record, a manual approval form, and a bank reconciliation form as described and illustrated later in detail. Central to the system is a suitable issuing company on-line computer 12.

Figure 2:
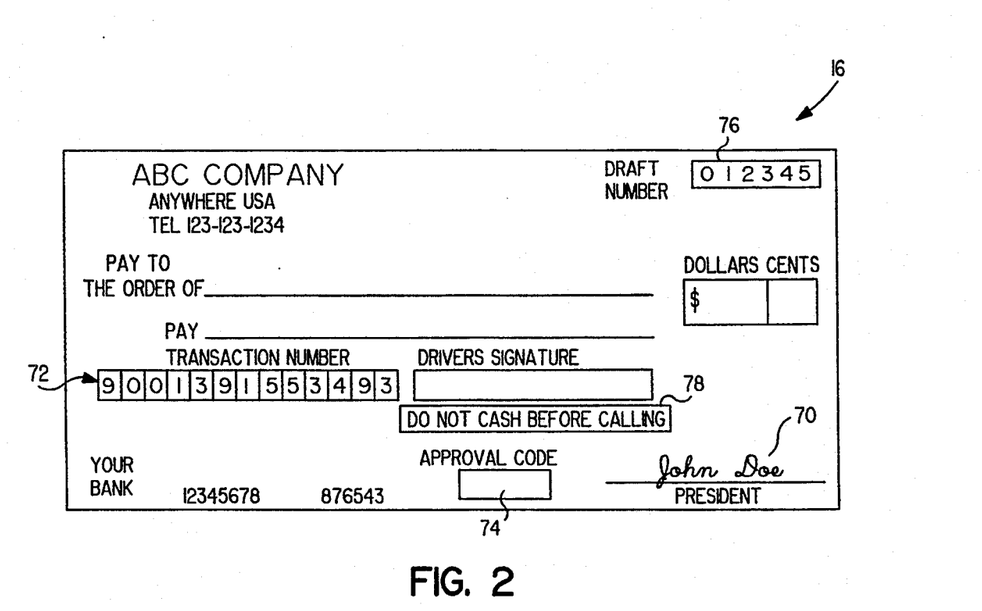
FIG. 2 illustrates a format of a presigned draft.

The issuing company is required to use "payable thru" or similar checking/draft account format 14. Special presigned drafts 16, as illustrated in FIG.2, are printed with the heading "DO NOT CASH BEFORE CALLING". These presigned drafts 16 also contain blanks for the transaction number and the approval number, which are subsequently filled in by an on-the-road or away from the company employee recipient 15. Prior to departure from the recipient's domicile, the issuing company main office 17 gives the employee recipient 15 a book of company presigned drafts 16, which are presigned but having blank spaces into which certain digits must be entered by the employee and merchant to complete the issuing company draft. The employee recipient 15 telephones the issuing company main office 17 by telephone, and verbally receives a transaction number previously generated by the on-line computer 12 containing the issuing company's number, the employee recipient's identification number, the serial number and the amount code. These codes are explained later in detail in FIG. 3. The employee recipient then enters the transaction number on the presigned draft 16, and presents the presigned draft 16 for cashing. The merchant 18 then telephones the on-line computer 12 of the check authorization system 10 on the merchant's touch tone telephone 20 for approval to cash the presigned draft 16. The issuing company's on-line computer 12 includes an interactive voice-DTMF card 22, such as Talking Technologies Power Line 1 Card, which interrogates the merchant by asking a progressive series of questions to be entered on a touch tone phone 20. Each question must be answered correctly before being allowed to move on to the next progressive step.

The telephone is first answered with a greeting message followed by a first question, which requests the merchant's area code and phone number. This information is recorded for tracking of the transaction, and the employee recipient's location. The area code and telephone number is checked for a correct area code and the correct length. If the details are incorrect, the answer is checked for a hang-up on the line, and if no hang-up has occurred, the question is repeated. This process will be attempted three times until a correct number is accepted, or a hang-up has occurred. If the number is not correct, the caller is denied approval and asked to call an alternate manual telephone number, and the computer is reset.

After successful completion and verification of the first data required in the previous paragraph, a second block of data is prompted, and the merchant 18 is requested to enter by the touch tone telephone the transaction number previously filled in by the employee recipient 15 on the presigned draft 16. Again, three attempts are given to respond with a valid transaction number. If no valid transaction number is received, the merchant 18 is denied approval, and the on-line computer 12 is reset. If the transaction number is accepted, the employee recipient 15 is identified, and the maximum valid amount is determined.

Upon successful interrogation and completion of the second data request, a third block of data is prompted requesting the merchant 18 to enter the draft serial number. Three attempts are given, and the draft serial number is accepted or denied.

Upon successful interrogation and completion of the third data request, a fourth block of data is prompted requesting the merchant 18 to enter the amount of the draft. If a predetermined maximum value of the transaction is exceeded, the draft is denied. If the amount of the draft is less than or equal to the maximum amount, the transaction file is updated to reflect the remaining value of the transaction, if any.

If all of the questions are answered correctly, a 5-digit approval number is given. This approval number is then entered in the approval code box 74 on the presigned draft 16, and the draft is then cashed by the merchant 18. This may also include the recipient's name, the issuing company's name and any other information the issuing company wishes to provide.

The on-line computer 12 is then reset to wait for the next call.

A printer 24, driven by the issuing company on-line computer 12, prints a record of transaction 26. Also connected to the issuing company on-line computer 12 is transaction history file 28, transaction master file 30, voice files 32, a storage device 34 for transaction history, and a storage device 36 for transaction storage.

An off-line computer 38 and a printer 40 connect at the issuing company main office 17 to generate, print and to output draft authorization records 42 which include draft authorization numbers.

Authorized issuing drafts 16a are presented to the issuing company's payable thru account 14 for payment and subsequent reconciliation, including a report of clearing drafts 43, issuing company accounting 44, and a summary of transactions 46. Valid drafts for clearing 48 from funding are then processed.

When the draft is presented for payment to the issuing company's bank, the bank will report to the issuing company the information required to identify the draft and the transaction. The issuing company then reconciles the drafts with the computer approvals, and accepts the drafts for payment or denies payment of authorized drafts.

An investigation is opened to determine the liability of the denied drafts. The outcome of the investigation will determine the path of the draft after denial.

FIG. 2 illustrates a format of a presigned draft 16 having an authorized signature 70, a divided transaction number blank 72, an approval code blank 74, a draft number box 76, and other information commonly found on drafts. The words "DO NOT CASH BEFORE CALLING" appear in box 78.

Figure 3:
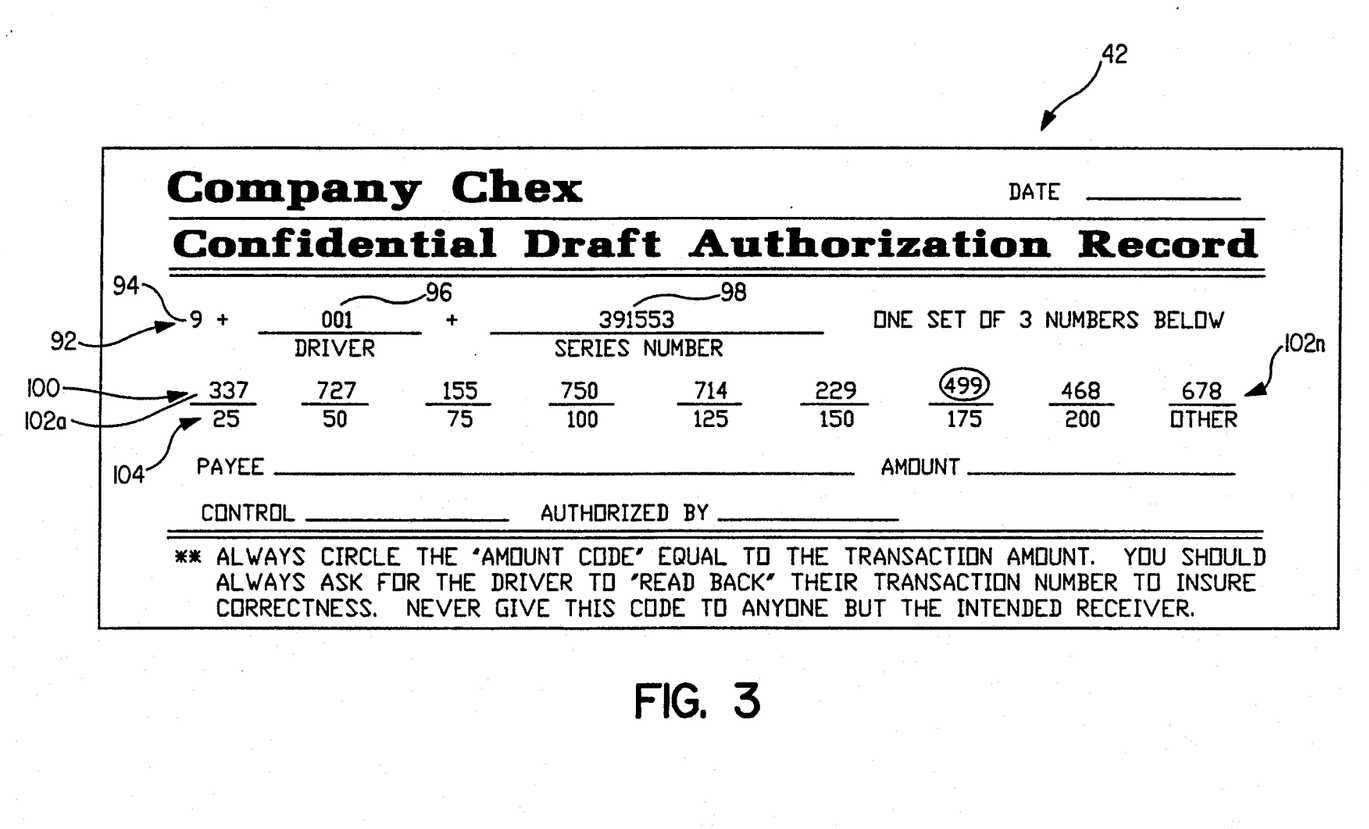
FIG. 3 illustrates a format of an authorization record.

FIG. 3 illustrates a format of an authorization record 42 where all numerals correspond to those elements previously described. The authorization record 42 is used by the issuing company main office 17. The authorization record 42 determines the transaction number 92, which is entered into the transaction number box 72 of the resigned draft 16 as illustrated in FIG. 2. The first number of the transaction number 92 is the issuing company identifier 94. The next set of three numbers 96 will identify the employee recipient 15 or any other identification the issuing company requests. The next set of six numbers of the transaction number 92 are a sequential series of numbers 98 identifying each authorization record 42. The last three numbers of the transaction number 92 are the amount identification code numbers 102a–102n found in line 100. There are a predetermined number of sets of corresponding dollar amount codes, and the other amount found is line 104 beneath each amount code identification code numbers 102a–102n. The transaction number is thus comprised of the issue company identifier 94, the employee recipient identification number 96, the sequential transaction identification digits 98 and one of amount identification code numbers 102a–102n. The amount code 493 is circled, thus indicating a maximum draft amount of $175. The number shown in this example is 9+001+391553+493 or 9001391553493, which would authorize an amount up to and including $175. Other information is also included as illustrated.

Figure 4:
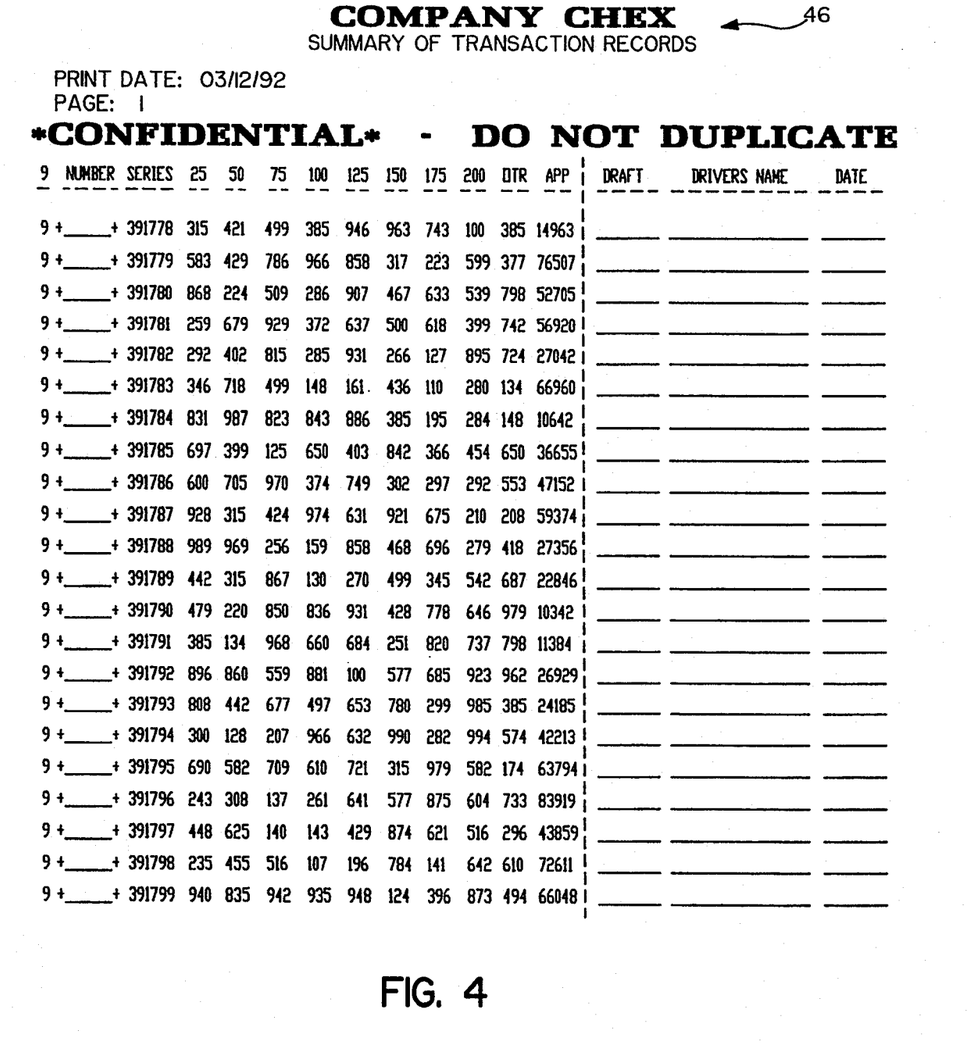
FIG. 4 illustrates a format of a summary of transaction records.

FIG. 4 illustrates a format of a summary of transaction records 46.

Figure 5:
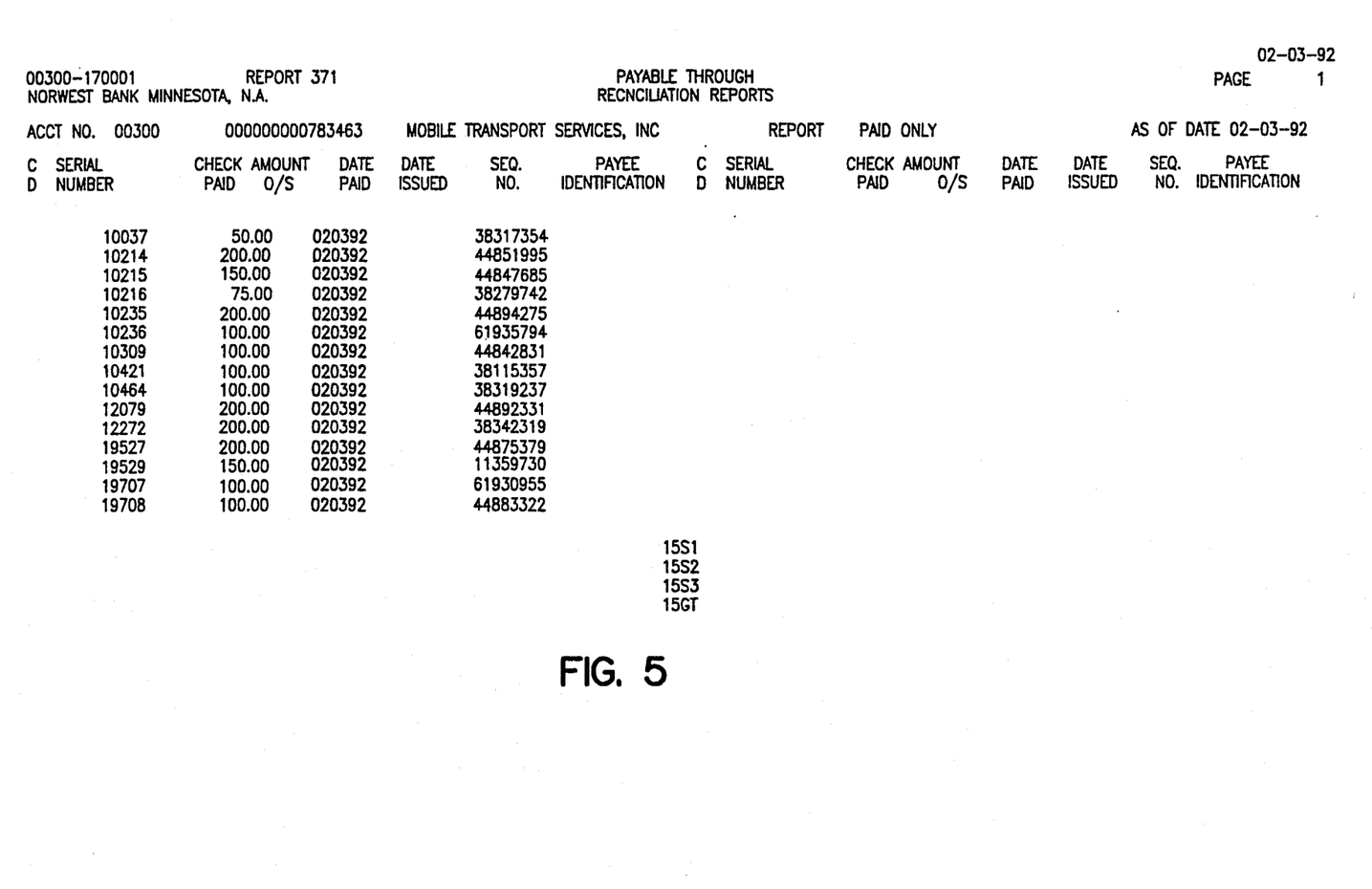
FIG. 5 illustrates a format of a reconciliation sheet.

FIG. 5 illustrates a format of a reconciliation sheet called report of clearing drafts 44.

MODE OF OPERATION

Figure 6A:
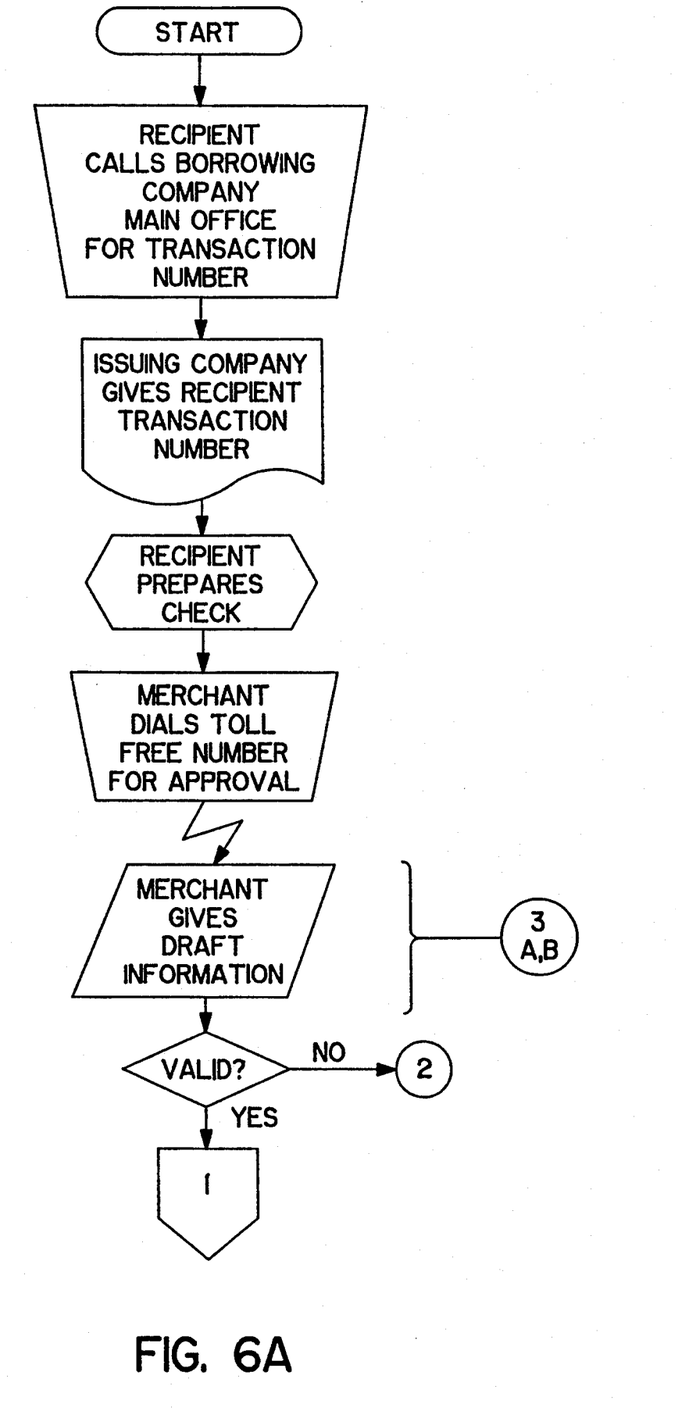
FIG. 6A–6F illustrates a system operational flow chart.
Figure 6B:
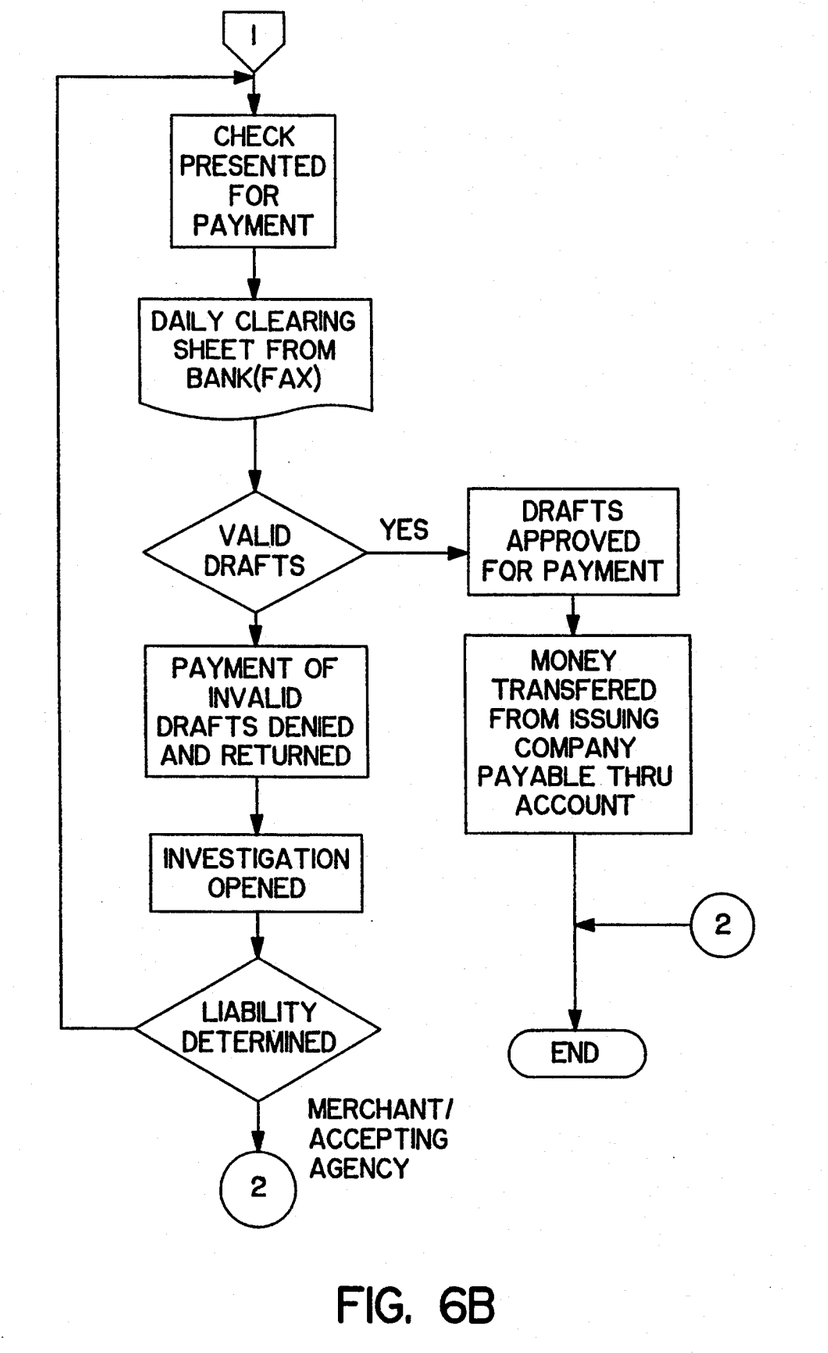
Figure 6C:
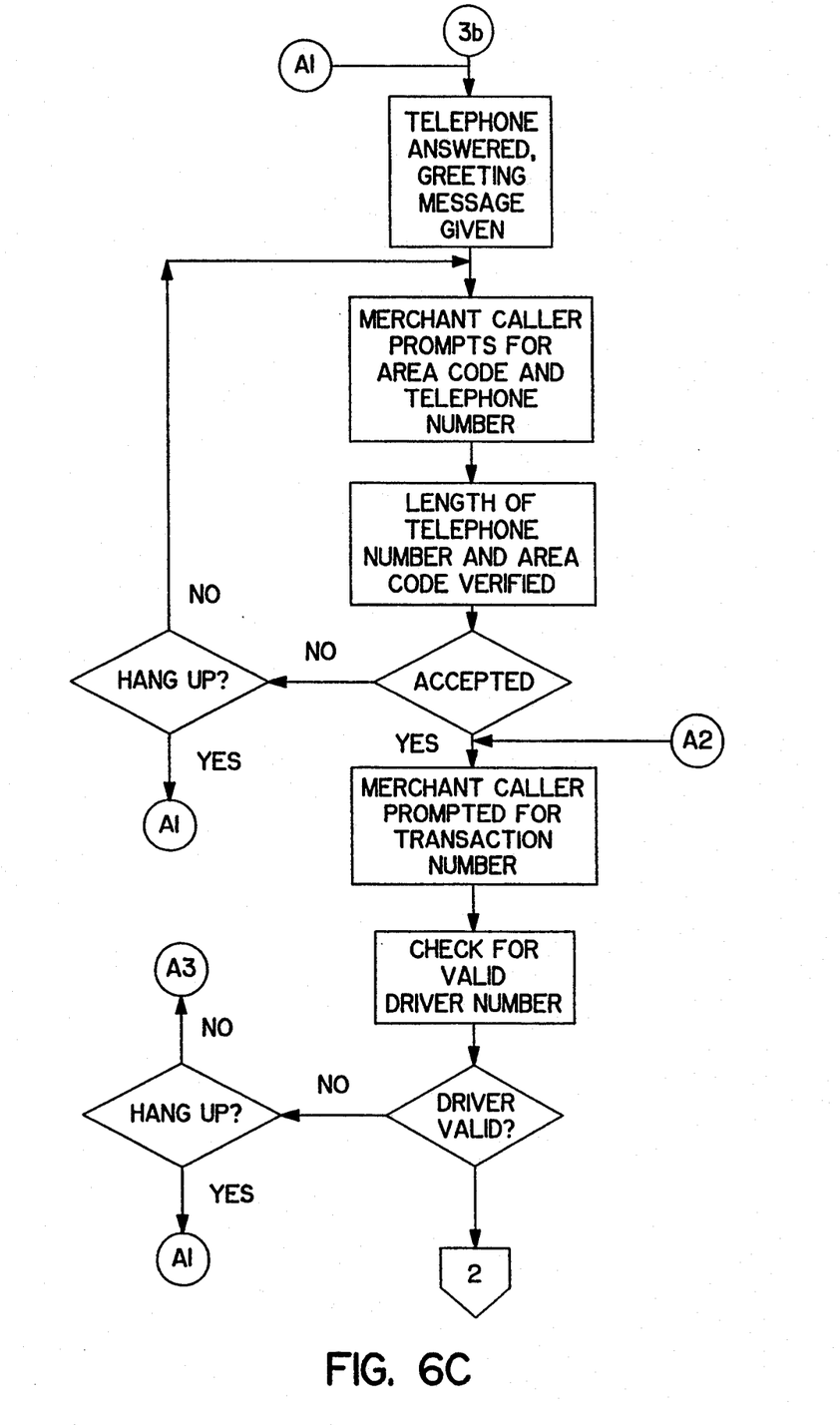
Figure 6D:
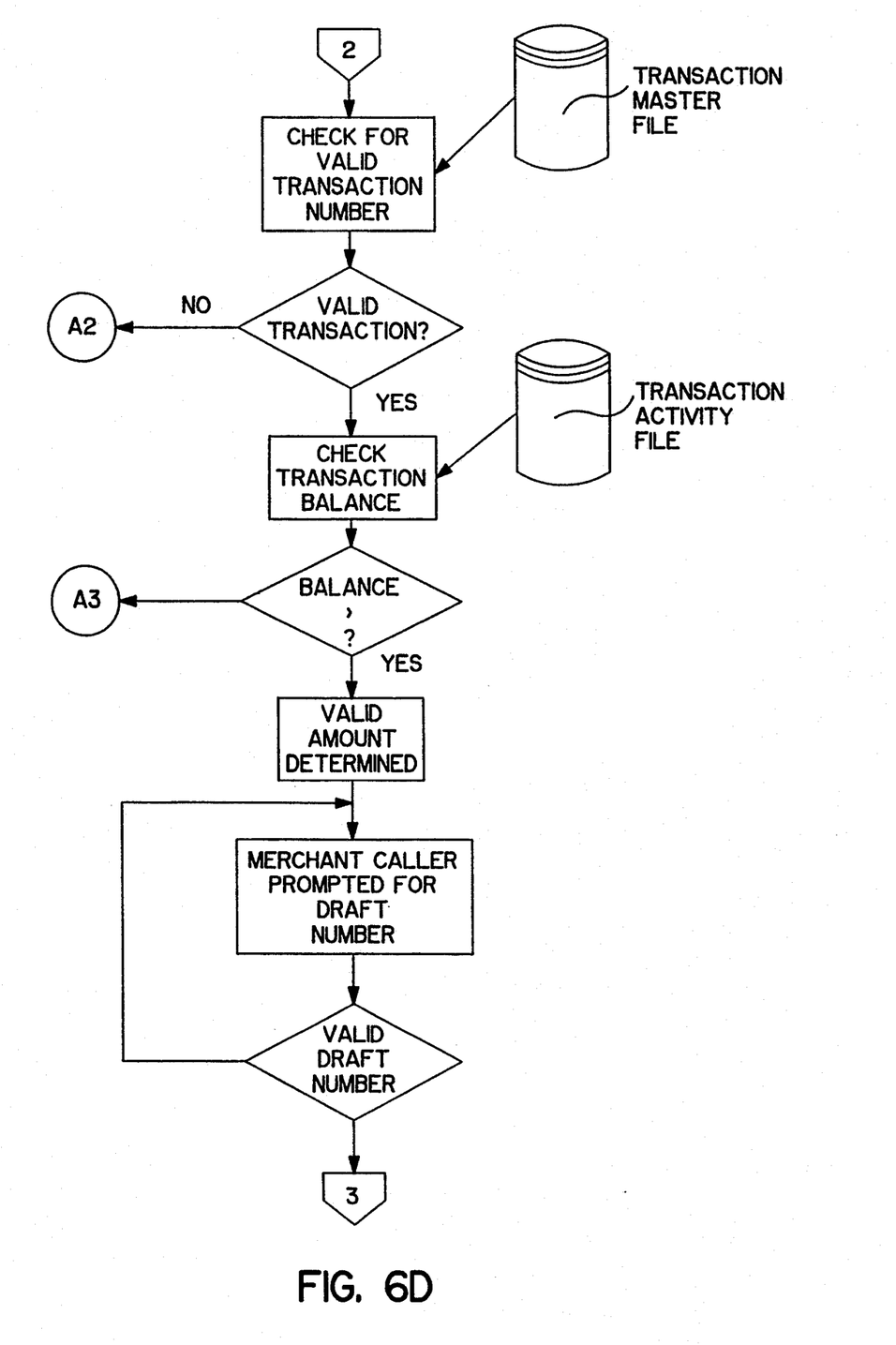
Figure 6E:
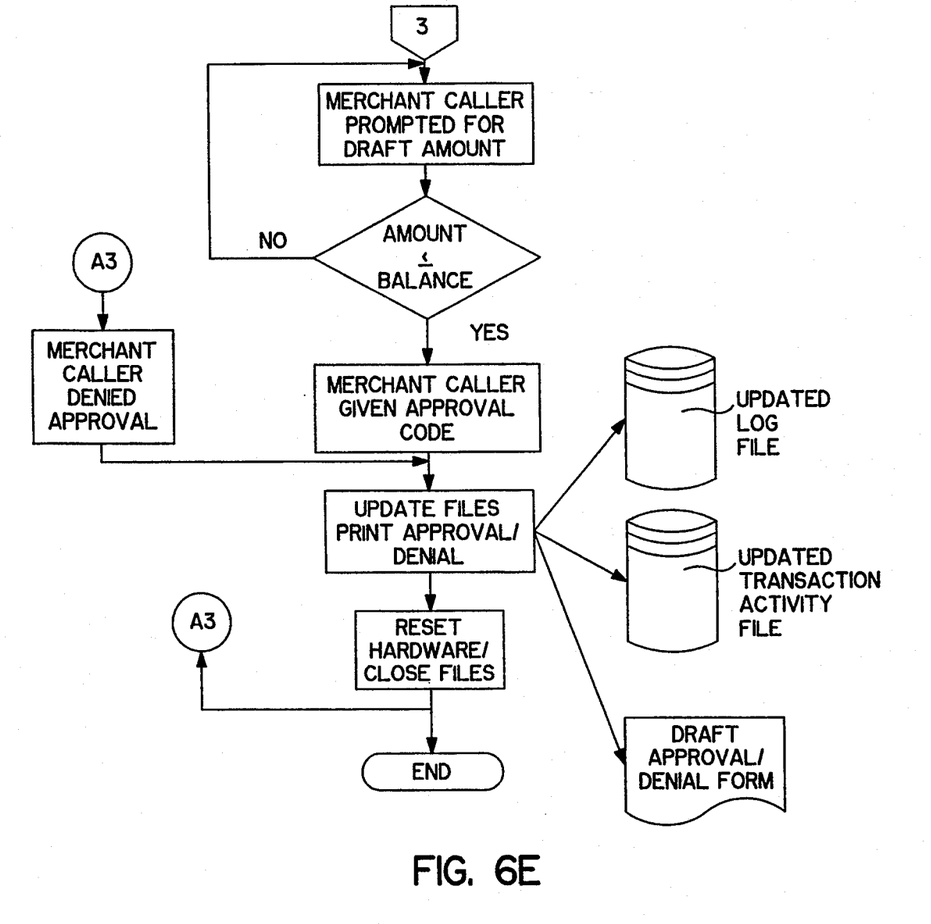
Figure 6F:
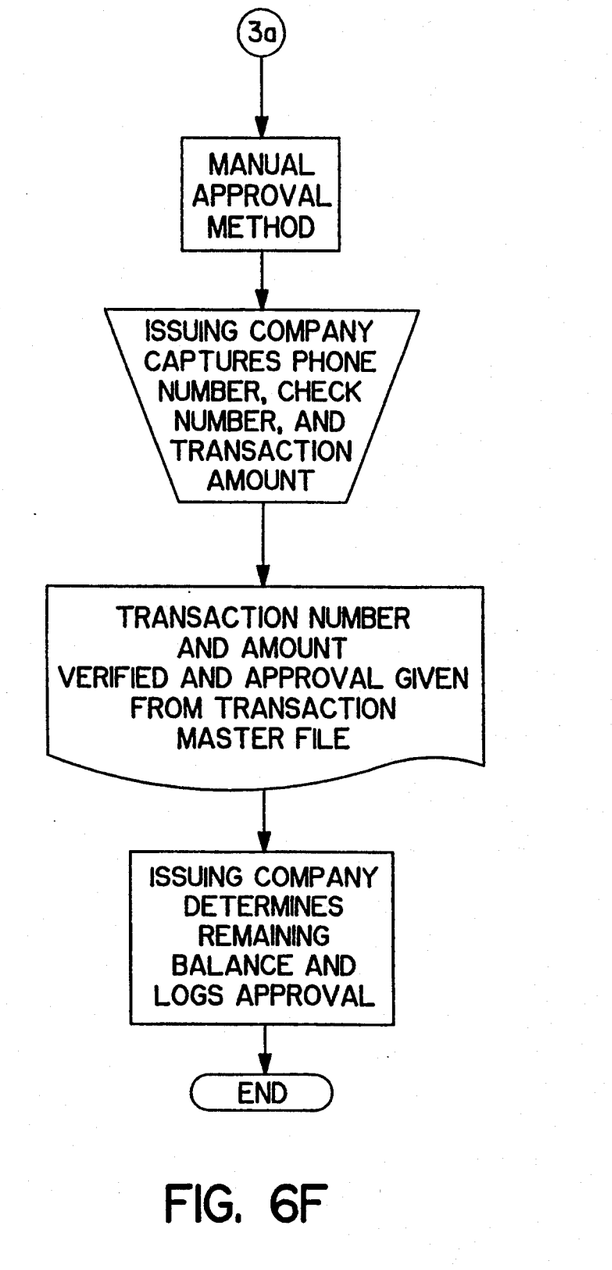

FIGS. 6A-6F illustrate a system operational flow chart. FIGS. 6A-6E illustrate the algorithm process of for the approval of checks and the process from the payee to payor through the company, merchant and bank. The software is attached hereto as Appendix 1. Also included in FIG. 6F is a manual approval method for use when the touch tone telephone mode of operation is not exercised.

Various modifications can be made to the present invention without departing from the apparent scope hereof.

We claim:

1. A process for a check authorization system allowing issuing company control of check authorization comprising the steps of:
   a. issuing a transaction authorization;
   b. transacting an approval code;
   c. directing bank reconciliation; and,
   d. tracking recipient location by telephone number.

2. The process of claim 1 further comprising the step of providing each bank draft with:
   a. presigned draft number;
   b. a transaction number;
   c. an approval code; and,
   d. the phrase "DO NOT CASH BEFORE CALLING."

3. The process of claim 1 wherein check authorization does not require a second party approval.

4. The process of claim 1 having a real time reconciliation feature.

5. The process of claim 1 where said recipient obtains a transaction number which is placed upon a presigned bank draft.

6. The process of claim 1 where a merchant is issued an approval code for entry upon a bank draft.

7. The process of claim 1 where a recipient is identified.

8. The process of claim 1 where a code is incorporated to determine a maximum valid draft amount.

9. The process of claim 1 which is automated and incorporating:
   a. an interactive voice DTMF card; and,
   b. a computer.

10. The process of claim 1 wherein a computer interrogates a merchant for transaction number, and a draft number of a bank draft and issues an approval code.

11. The process of claim 1 having a manual approval feature.

12. The process of claim 1 which allows the issuing company to draw funds on their own bank accounts.

13. The process of claim 1 which allows the issuing company the security to authorize and approve field drafts.

14. The process of claim 1 further comprising the use of bank draft means including:
   a. presigned draft number;
   b. a transaction number means on said draft means;
   c. an approval code means on said draft means; and,
   d. means phrasing "DO NOT CASH BEFORE CALLING" on said draft means.

15. The process of claim 1 including the use of tracking means for recipient location by telephone number means.

16. A check authorization system allowing issuing company control of check authorization, comprising:
   a. a computer means with at least one check processing algorithm;
   b. means for issuing a transaction authorization for writing a check;
   c. means for transacting an approval code to said written check; and,
   d. means for direct bank reconciliation for said written check.

17. A check authorization system of claim 16 wherein said computer means interrogates a merchant for transaction number and a draft number of said written check and issues an approval code.

18. A check authorization system of claim 16 including means for the issuing company to draw funds on their own bank accounts.

19. A check authorization system of claim 16 including means for the issuing company to authorize and approve field drafts.

* * * * *